United States Patent [19]
Peck

[11] 3,951,280
[45] Apr. 20, 1976

[54] VEHICLE-TRANSPORTING APPARATUS

[75] Inventor: Albert William Peck, Welwyn Garden City, England

[73] Assignee: John Ratcliff (Tail Lifts) Limited, Welwyn Garden City, England

[22] Filed: Nov. 20, 1974

[21] Appl. No.: 525,663

[52] U.S. Cl............................ 214/86 A; 214/75 H; 214/332
[51] Int. Cl.².......................................... B65G 47/00
[58] Field of Search............ 214/130 R, 86 A, 75 H, 214/330, 331, 332, 333; 212/8 R, 9; 16/139, 142, 146

[56] References Cited
UNITED STATES PATENTS

| | | | |
|---|---|---|---|
| 2,625,279 | 1/1953 | Dalby et al. | 214/86 A |
| 2,900,096 | 8/1959 | Dempster et al. | 214/130 R |
| 3,434,607 | 3/1969 | Nelson | 214/86 A |
| 3,522,892 | 8/1970 | Vegors | 214/86 A |
| 3,830,387 | 8/1974 | Virnig | 214/333 |

Primary Examiner—Robert J. Spar
Assistant Examiner—Lawrence J. Oresky
Attorney, Agent, or Firm—Young & Thompson

[57] ABSTRACT

There is disclosed a vehicle transporting apparatus comprising a mounting for attachment to the rear of a transporting vehicle, a rearwardly extending boom one end of which is pivotally connected to the mounting for up and down swinging movement of the boom on the mounting, the free end of the boom having mounted thereon two supports for the wheels of a vehicle to be transported, which supports are spaced horizontally apart in a direction transverse to the direction of travel of the vehicle, power means connected to the boom to effect swinging movement thereof between a loading position where the supports rest on the ground, a transporting position where the supports are raised a short distance above the ground, and a stowed position where the boom extends upwardly from the mounting, and releasable detent means between the boom and the mounting to retain the boom in one or more of said positions.

4 Claims, 3 Drawing Figures

VEHICLE-TRANSPORTING APPARATUS

FIELD OF THE INVENTION

The invention relates to vehicle-transporting apparatus and sets out to provide a simple and convenient apparatus for attachment to a transporting vehicle for the purpose of raising one end of an automobile, or light vehicle, so that the weight of the vehicle is supported on two of its wheels thus permitting easy towing of the vehicle.

SUMMARY OF THE INVENTION

According to the invention vehicle-transporting apparatus comprises a mounting for attachment to the rear of a transporting vehicle, a rearwardly extending boom one end of which is pivotally connected to the mounting for up and down swinging movement of the boom on the mounting, the free end of the boom having mounted thereon two supports for the wheels of a vehicle to be transported, which supports are spaced horizontally apart in a direction transverse to the direction of travel of the vehicle, power means connected to the boom to effect swinging movement thereof between a loading position where the supports rest on the ground, a transporting position where the supports are raised a short distance above the ground, and a stowed position where the boom extends upwardly from the mounting, and releasable detent means between the boom and the mounting to retain the boom in one or more of said positions.

BRIEF DESCRIPTION OF THE DRAWINGS

FIG. 3 is an enlarged view of part of FIG. 2 showing the detent mechanism.

DESCRIPTION OF THE PREFERRED EMBODIMENT

Figure 1:
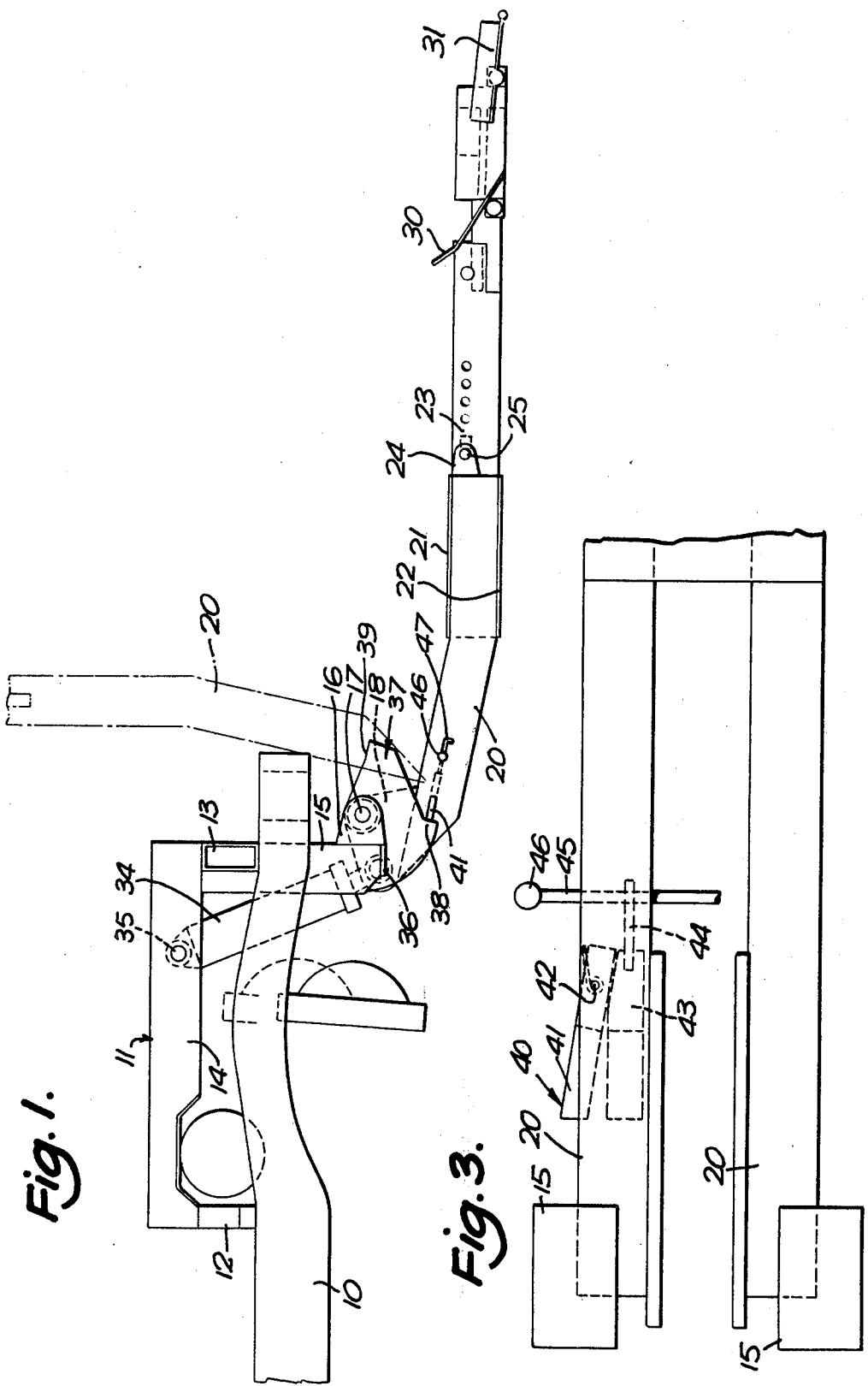
FIG. 1 is a side elevation of apparatus according to the invention mounted on a towing vehicle.
Figure 2:
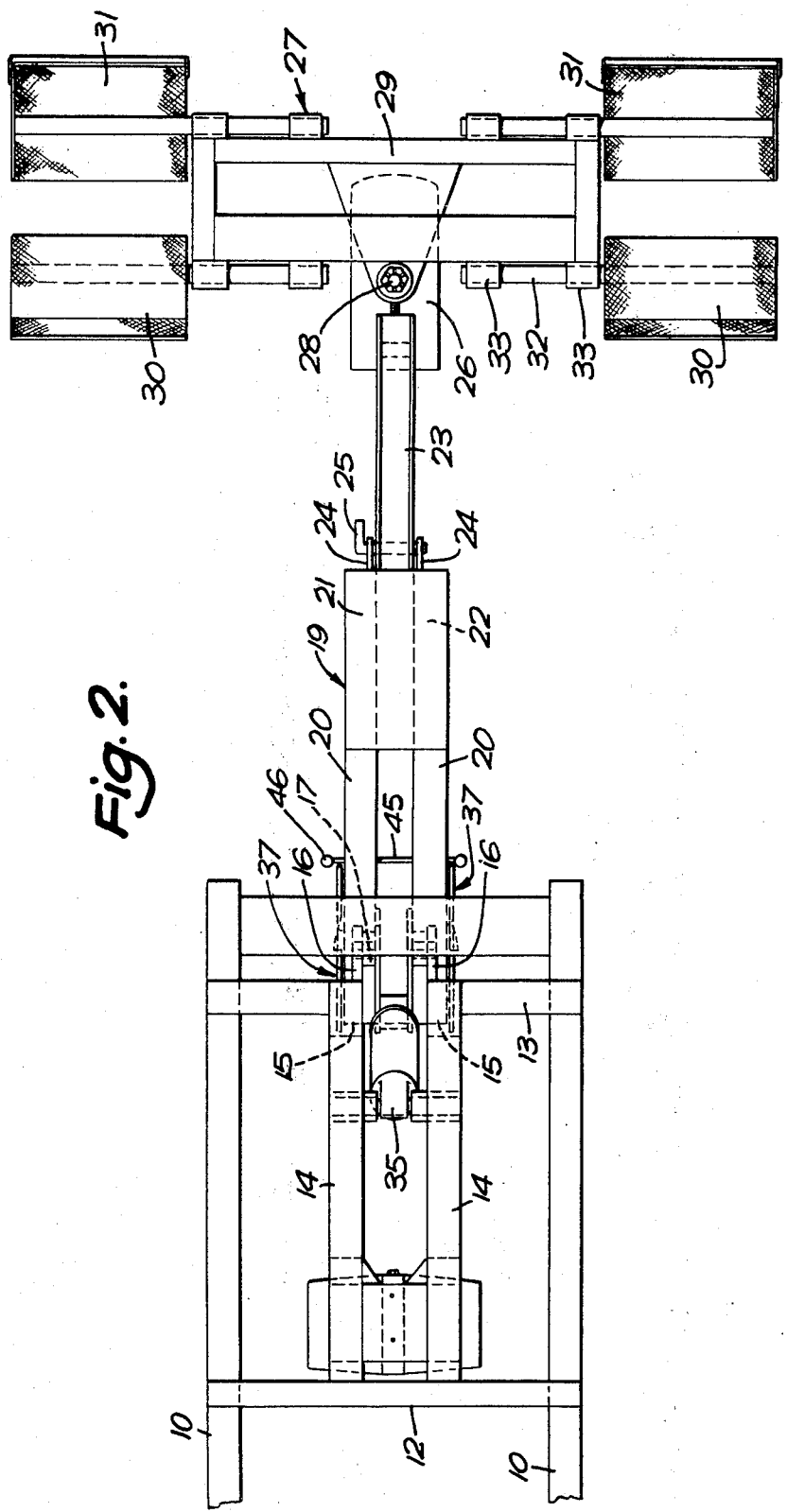
FIG. 2 is a plan view of the apparatus shown in FIG. 1.

Referring to FIGS. 1 and 2 the rear end of the towing vehicle comprises two spaced parallel chassis members 10 which carry a mounting 11 for the vehicle-transporting apparatus.

The mounting 11 comprises front and rear cross beams 12 and 13 respectively which extend between and above the chassis members 10. The cross beams 12 and 13 are connected by two upper beams 14 which are spaced equally on either side of the centre line of the vehicle and extend in a fore and aft direction. Posts 15 extend downwardly from the rear ends of the beams 14.

At their lower ends, the posts 15 carry rearwardly extending brackets 16 between which extends a pivot pin 17.

Pivotally mounted on the pivot pin 17 are spaced parallel brackets 18 mounted on one end of a boom 19. As best seen in FIG. 2 the boom 19 comprises, at the end where it is pivotally attached to the mounting, two spaced parallel beams 20 bridged together at their rearward end by upper and lower panels 21 and 22 so as to define a box section in which is received the front end of a further beam 23. The beam 23 is slidable within a box section and is formed along its length with holes which register with holes in lugs 24 mounted at the rear ends of the beams 20 so that the beam 23 may be locked in a required longitudinal position with respect to the beams 20 by inserting a locking member 25 through the registering holes when the beam 23 is in the required position.

At its rearward end the beam 23 carries a horizontal plate 26. A support cradle 27 for the wheels of a vehicle to be towed by the apparatus is pivotally connected to the plate 26 by means of an upright pivot pin 28 so that the cradle 27 may swing about an upright axis when the mean is horizontal.

The cradle 27 comprises a cross structure 29 to each end of which are mounted wheel supports 30 and 31. Each wheel support comprises a metal plate mounted on a horizontal shaft 32 which is free to rotate in sockets 33 provided on the structure 29 so that the plates may pivot about horizontal transverse axes.

The boom 19 is arranged to be swung upwardly on the pivot pin 17 by a single-acting hydraulic ram 34 the end of the cylinder of which is pivotally connected between the beams 14 by means of a cross shaft 35. The push rod of the ram is pivotally connected by means of a pin 36 between the aforementioned brackets 18.

The pin 36 is spaced from the pin 17 so that by extending ram 36 the boom 19 may be swung upwardly.

In operation the boom 19 is first lowered to a position where the supports 30 and 31 rest on the ground. The rear support plates 31 adopt the position shown in FIG. 1 so that the front wheels of a vehicle to be towed may be pushed across the plates 31 so as to rest partially on those plates and partially on the plates 30. The wheels of the vehicle to be towed may then be secured to the plates by any convenient method, such as by chains, ropes, or clips. The ram 34 is then extended so as to lift the boom 19 a short distance above the ground so as to raise the front wheels of the vehicle to be towed. As this happens the weight of the vehicle to be towed presses down between the support plates 30 and 31 so as to be located in the angle between them. THe vehicle may then be towed in this condition.

When the apparatus is not in use for towing a vehicle it may be swung upwardly, by extending the ram 34, to the position shown in chain lines in FIG. 1. When the boom is in this position the beam 23 is best retracted between the beams 20 so as to reduce the overall height of the boom.

The invention also provides means for retaining the boom in the towing and stowed positions, and this will now be described.

Abutment plates 37 are fixedly secured to the mounting 11 at the lower ends of the posts 15. Each abutment plate overlies the outer face of one of the beams 20 and is formed with two shoulders 38 and 39.

As best seen in FIG. 3 there is mounted in each beam 20 a movable catch member indicated generally at 40 (only one of the movable catch members is shown in FIG. 3).

The movable catch member comprises a lever arm 41 which is pivotally mounted on the beam 20 for swinging movement about an upright pivot pin 42. Each lever 41 is urged by a spring 41a to the position shown in FIG. 3. In this position one end of the lever projects laterally from the beam 20 and the other end engages a wedge member 43 which is slidable within the beam 20. Each wedge member 43 is connected through a bracket 44 with a cross rod 45 which projects laterally from the beam 20 and is provided with a manipulating knob 46. It will be seen that when the knob 46 is moved to the right in FIG. 3 the wedge member 43 will engage the lever 41 and cause it to swing anticlockwise so that the end of the lever is retracted into the beam 20. When the knob 46 is moved to the left again the lever 41 is returned to the position shown in FIG. 3 by the aforementioned spring. As best seen in FIG. 1 the wall of the beam 20 through which the rod 45 passes is provided with an L-shaped slot 47 so that the rod 45 can be retained in the position where the lever 41 is retracted.

In the position shown in FIG. 1 in which the boom 19 is in a substantially horizontal towing position the lever 41 engages the shoulder 36 and this retains the boom in the towing position. When it is required to lower the boom onto the ground the knob 46 is moved to the right and this retracts the lever 41 so that it clears the shoulder 38 permitting the boom to swing downwardly as the ram 34 is depressurised.

When it is required to raise the boom to the upright stowed position it is swung to this position and the knob 46 is moved to allow the lever 41 to project and engage the shoulder 39 on the plate 37 so as to retain the boom in the upright stowed position.

As mentioned above the catch arrangement described is preferably duplicated in both of the beams 20 and in this case the rod 45 is common to the two systems and extends across and between the beams 20 as shown in FIG. 2. In this case a further manipulating member may be provided on the rod 45 between the beams 20 to facilitate moving the rod 45 without tilting it and thus providing unequal movement of the levers 41.

I claim:

1. A vehicle-transporting apparatus comprising in combination:
   a. a mounting for attachment to the rear of a towing vehicle,
   b. a longitudinally extending boom the forward end of which is pivotally connected to the mounting by a boom pivot,
   c. a hydraulic ram between the boom and the mounting to effect up and down swinging movement of said boom about said boom pivot,
   d. two supports, mounted adjacent the rearward end of the boom and spaced apart across said boom for receiving the wheels of a vehicle to be transported,
   e. said ram having its line of action on the other side of said boom pivot said supports,
   f. releasable detent means between the boom and the mounting to retain said boom alternatively in a loading position in which said supports rest on the ground, a transporting position in which said supports are raised a short distance from the ground, and a stowed position in which said boom extends upwardly from said mounting further said detent means comprise a movable catch member on one of said boom and said mounting engagable with an abutment fixed relatively to the other of said boom and mounting, and said movable catch member further comprises a pivotally mounted lever, pivotal movement of which swings one end thereof into an operative position in which it is engagable with said abutment upon swinging movement of said boom.

2. The apparatus of claim 1 wherein there is provided a manipulating member, a part of which is operatively connected to the other end of said lever and is movable linearly in a direction to effect pivoting of said lever.

3. The apparatus of claim 2 in which said lever is spring-urged towards its said operative position, said manipulating member being arranged to pivot said lever to an inoperative position against the action of the spring means.

4. The apparatus of claim 3 in which said catch member is incorporated in the boom and said abutment is fixed relative to said mounting.

* * * * *